United States Patent
Duan et al.

(10) Patent No.: US 11,039,009 B2
(45) Date of Patent: Jun. 15, 2021

(54) REAL-TIME COMMUNICATION WITH A CALLER WITHOUT ACCEPTING A CALL

(71) Applicant: International Business Machines Corporation, Armonk, NY (US)

(72) Inventors: Xue Fei Duan, Beijing (CN); Jonathan Dunne, Dungarvan (IE); Xiao Ting Xiao, Beijing (CN); Chao Feng Wu, Beijing (CN); Dong Jun Zong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/666,394

(22) Filed: Aug. 1, 2017

(65) Prior Publication Data
US 2019/0045056 A1 Feb. 7, 2019

(51) Int. Cl.
*H04M 3/436* (2006.01)
*H04M 3/42* (2006.01)
*H04L 12/58* (2006.01)
*H04M 3/533* (2006.01)

(52) U.S. Cl.
CPC ........ *H04M 3/42382* (2013.01); *H04L 51/02* (2013.01); *H04L 51/04* (2013.01); *H04L 51/046* (2013.01); *H04M 3/42042* (2013.01); *H04M 3/42093* (2013.01); *H04M 3/436* (2013.01); *H04M 3/53308* (2013.01); *H04M 2203/2072* (2013.01); *H04M 2203/651* (2013.01)

(58) Field of Classification Search
CPC ....... H04L 51/04; H04L 51/046; H04L 51/02; H04M 3/42042; H04M 3/42093; H04M 3/42382; H04M 3/53308; H04M 3/436
See application file for complete search history.

(56) References Cited

U.S. PATENT DOCUMENTS

| | | | |
|---|---|---|---|
| 6,253,075 B1 | 6/2001 | Beghtol et al. | |
| 6,707,890 B1 | 3/2004 | Gao et al. | |
| 7,260,205 B1 * | 8/2007 | Murphy | H04M 3/42042 370/352 |
| 7,406,170 B2 * | 7/2008 | Gray | H04M 3/4217 379/211.01 |
| 9,241,059 B2 | 1/2016 | Scott et al. | |

(Continued)

FOREIGN PATENT DOCUMENTS

WO 2009021120 A2 2/2009

OTHER PUBLICATIONS

Wikipedia, "Computer Vision", page last edited on Nov. 7, 2019, 15 pages, https://en.wikipedia.org/w/index.php?title=Computer_vision&oldid=925019072.

*Primary Examiner* — Asghar H Bilgrami
(74) *Attorney, Agent, or Firm* — Robert R. Aragona

(57) ABSTRACT

A system and method for facilitating real-time communication with a caller without a user accepting a call, wherein the system or method: receives a notification of the call; obtains information about the user and the caller from one or more data sources; determines the user's temporal status at a given point in time and the caller's identity based on the information; generates a context-specific message based on the user's temporal status and the caller's identity, wherein the message summarizes the user's temporal status; and provides the message to the caller. Alternatively, the message is a generic message, when the caller's identity cannot be determined.

17 Claims, 7 Drawing Sheets

(56) References Cited

U.S. PATENT DOCUMENTS

| | | | |
|---|---|---|---|
| 2004/0243941 A1* | 12/2004 | Fish | G06Q 10/107 |
| | | | 715/752 |
| 2005/0043951 A1 | 2/2005 | Schurter et al. | |
| 2006/0030264 A1* | 2/2006 | Morris | H04L 67/24 |
| | | | 455/41.2 |
| 2006/0046776 A1* | 3/2006 | Chen | H04M 1/642 |
| | | | 455/556.1 |
| 2006/0147014 A1* | 7/2006 | Smith | H04M 3/436 |
| | | | 379/210.02 |
| 2010/0067679 A1* | 3/2010 | Lei | H04L 67/24 |
| | | | 379/201.02 |
| 2011/0034154 A1* | 2/2011 | Maxfield | H04M 3/436 |
| | | | 455/414.1 |
| 2012/0117224 A1* | 5/2012 | Andrews | H04L 65/1069 |
| | | | 709/224 |
| 2013/0007150 A1* | 1/2013 | Hertz | H04L 51/32 |
| | | | 709/206 |
| 2014/0118465 A1* | 5/2014 | Scott | H04M 1/72519 |
| | | | 348/14.03 |
| 2016/0006867 A1* | 1/2016 | Czarnecki | H04M 3/42093 |
| | | | 455/414.1 |
| 2017/0344703 A1* | 11/2017 | Ansari | H04L 63/0876 |
| 2018/0032997 A1* | 2/2018 | Gordon | G06Q 20/3224 |
| 2018/0307326 A1* | 10/2018 | Hoggeg | A44C 5/0007 |
| 2019/0245851 A1* | 8/2019 | Whaley | G06F 21/88 |

\* cited by examiner

REAL-TIME COMMUNICATION WITH A CALLER WITHOUT ACCEPTING A CALL

BACKGROUND

The present invention relates generally to a system and method for real-time communication with a caller without accepting a call.

SUMMARY

The invention provided herein has a number of embodiments useful, for example, in a system and method for facilitating real-time communication with a caller without a user accepting a call, wherein the system or method: receives a notification of the call; obtains information about the user and the caller from one or more data sources; determines the user's temporal status at a given point in time and the caller's identity based on the information; generates a context-specific message based on the user's temporal status and the caller's identity, wherein the message summarizes the user's temporal status; and provides the message to the caller. Alternatively, the message is a generic message, when the caller's identity cannot be determined.

The information about the user is obtained from: the user's calendar to determine whether there is a scheduled meeting, appointment or event; the user's instant messaging to determine whether the user is available, busy, away, in a meeting, do not disturb, or offline; the user's social network applications to determine whether there is status related information for the user; and the user's smartphone camera to obtain images that can assist determining the user's temporal status.

The information about the caller is obtained from a calling number and the user's contact list, wherein the caller's identity is determined from the calling number and the user's contact list.

A rule may be performed that automatically accepts or rejects the call, wherein the message is provided to the caller when the call is not accepted or rejected. The user pre-defines the rules identifying when calls should be rejected or accepted.

BRIEF DESCRIPTION OF THE DRAWINGS

Referring now to the drawings in which like reference numbers represent corresponding parts throughout.

DETAILED DESCRIPTION

Figure 1:
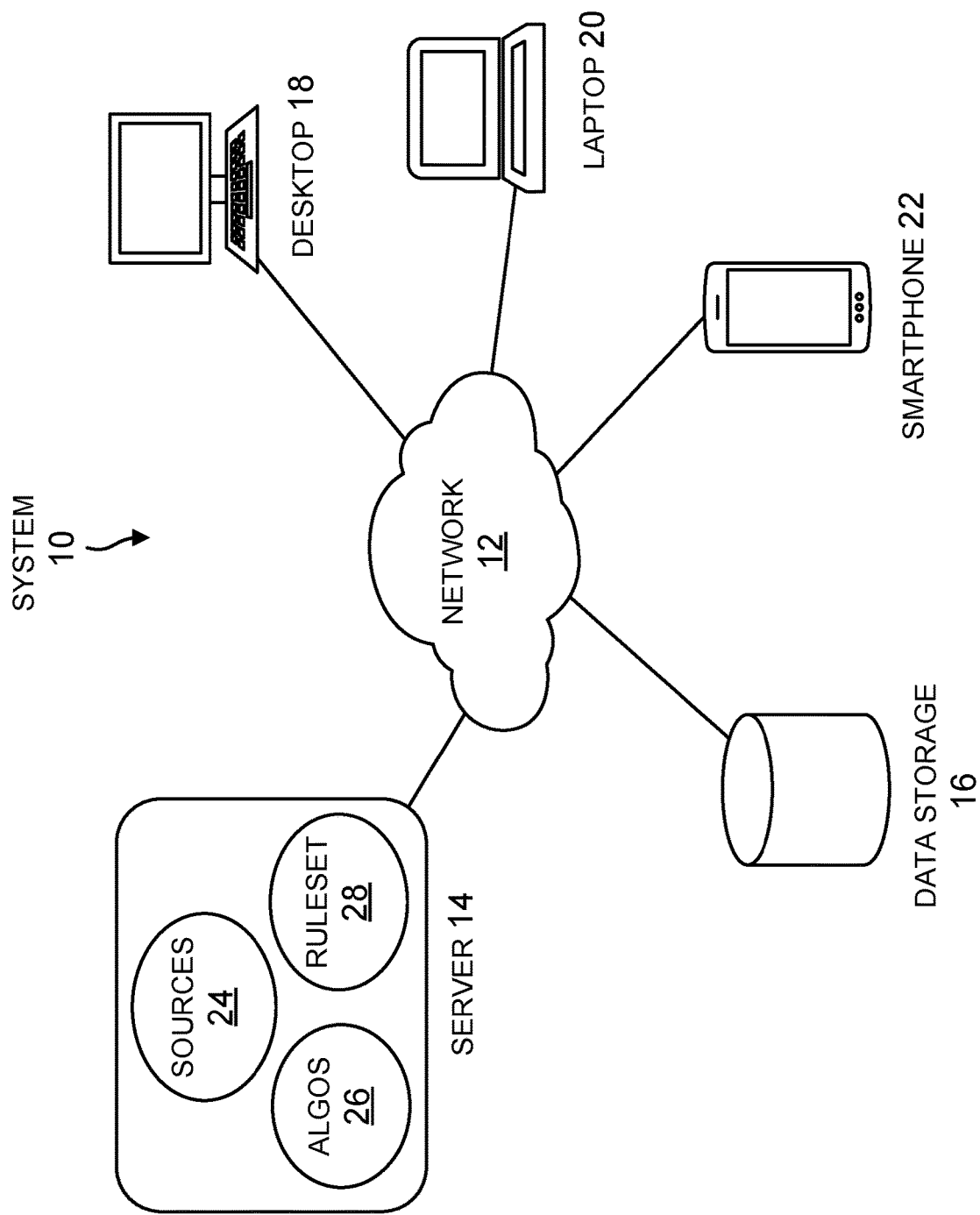
FIG. 1 is a pictorial representation of a system in which the invention may be implemented.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

Mobile phones provide great convenience in that they allow users to communicate anywhere with anybody whose number is available. At the same time, users may receive too many calls. Users may also receive calls under conditions when answering the call is not possible, such as when the user is giving a presentation or participating in a meeting. The issue then becomes, how to communicate with the caller? Specifically, how to provide the caller with appropriate information on the user's situation or current activity without interrupting the user?

Making the phone silent is one solution that prevents the user from being interrupted. However, the caller is not provided with information about the user's situation or current activity, and why the call cannot be accepted.

Another solution is the use of voice mail. When the user cannot accept the call, the call may be forwarded to voice mail, with a notification sent to the user's phone when a new message is stored in the voice mail. However, voice mail typically does not provide a message or greeting to the caller that describes the user's situation or current activity, unless the user manually specifies such a message or greeting, which may involve significant extra effort. Instead, the voice mail typically only provides a general message or greeting indicating that the user is not available to accept the call.

Yet another solution might involve sending a text message to the caller after the call is rejected. However, the user must listen to the voice mail, and then manually type and send such a text message. Sometimes, the user's situation or current activity prevents such a response, for example, when the user is giving a presentation or participating in a meeting. On the other hand, if the user does not inform the caller of the user's situation or current activity, and why the call cannot be accepted, the caller may call the user repeatedly.

Therefore, there is a need in the art for a system and method which can do the following:

1. Allow the user to reject the call automatically or manually without being interrupted, wherein the rejection is simple and easy to use.
2. Allow the user's situation or current activity to be communicated with the caller in a manner appropriate with the caller's identity without the user being interrupted.

To accomplish this, the present invention performs the following functions or steps:

1. The system leverages information sources about the user, such as the user's calendar, instant messaging, social network applications, camera imaging, and other information.
2. The system leverages information sources about the caller, such as the calling number, the user's contact list or directory, and other information.
3. Using these information sources, the system determines the user's temporal status and the caller's identity.
4. Based on the user's temporal status and the caller's identity, the system generates a context-specific message or greeting appropriate for the caller's identity that summarizes the user's temporal status.

5. Based on a predetermined rule set, the user may manually or automatically accept the call or reject the call, wherein the message or greeting is provided to the caller when the call is not accepted.

Hardware and Software Environment

With reference now to FIG. 1, a pictorial representation of a real-time communications system 10 is presented in which the invention may be implemented. The system 10 facilitates real-time communication with a caller without a user accepting a call.

The system 10 includes a network 12, which is the medium used to provide communications links between various devices and computers connected together within the system 10. In the depicted example, the network 12 may be one or more interconnected networks, such as a local area network (LAN), a wide area network (WAN), the Internet, a cellular phone network, a cellular data network, and other networks.

In the depicted example, a server computer 14 is connected to the network 12 along with a data storage unit 16 that may store programs, instructions and data associated with the invention. In addition, client computers 18, 20, 22 are connected to the server computer 14 via the network 12. These client computers 18, 20, 22 may be, for example, desktop computers 18, laptop or notebook computers 20, smartphones 22 and other devices.

In the depicted example, the server computer 14 implements the functionality of the system 10 for facilitating real-time communication with the caller without the user accepting the call, using one or more data sources 24, stochastic algorithms 26 and predefined rulesets 28, as described in more detail below. However, any of the steps or functions involved in the present invention may be implemented in whole or in part in one or more of the computers, i.e., in the server computer 14 and/or any of the client computers 18, 20, 22.

The present invention may be invoked manually or automatically. In one embodiment, the present invention is invoked manually or automatically by the user using an application on their smartphone 22. The application on the smartphone 22 then communicates with the server 14, informing the server 14 that the present invention has been invoked.

Technical Description

The present invention generates context-specific messages for a caller when a user rejects or does not accept an incoming call, based on the user's temporal status and the caller's identity. The present invention works with mobile phones 22, as well as desk phones, soft phones and other communications devices.

The present invention can help the user effectively communicate with the caller without the user being interrupted. For example, if the user is in a meeting with a company executive, the system 10 would perform a predefined rule set that rejects the call by providing a first context-specific message to a first caller identified as internal to the company, such as:

"I am in a meeting with Jane, the Development Vice President. Please call back after 2 pm."

while providing a second context-specific message to a second caller identified as external to the company, such as:

"I am in an important meeting. Please call back after 2 pm."

With these messages delivered to the caller, the user is not interrupted by the caller, yet significant information is conveyed to the caller.

Figure 2:
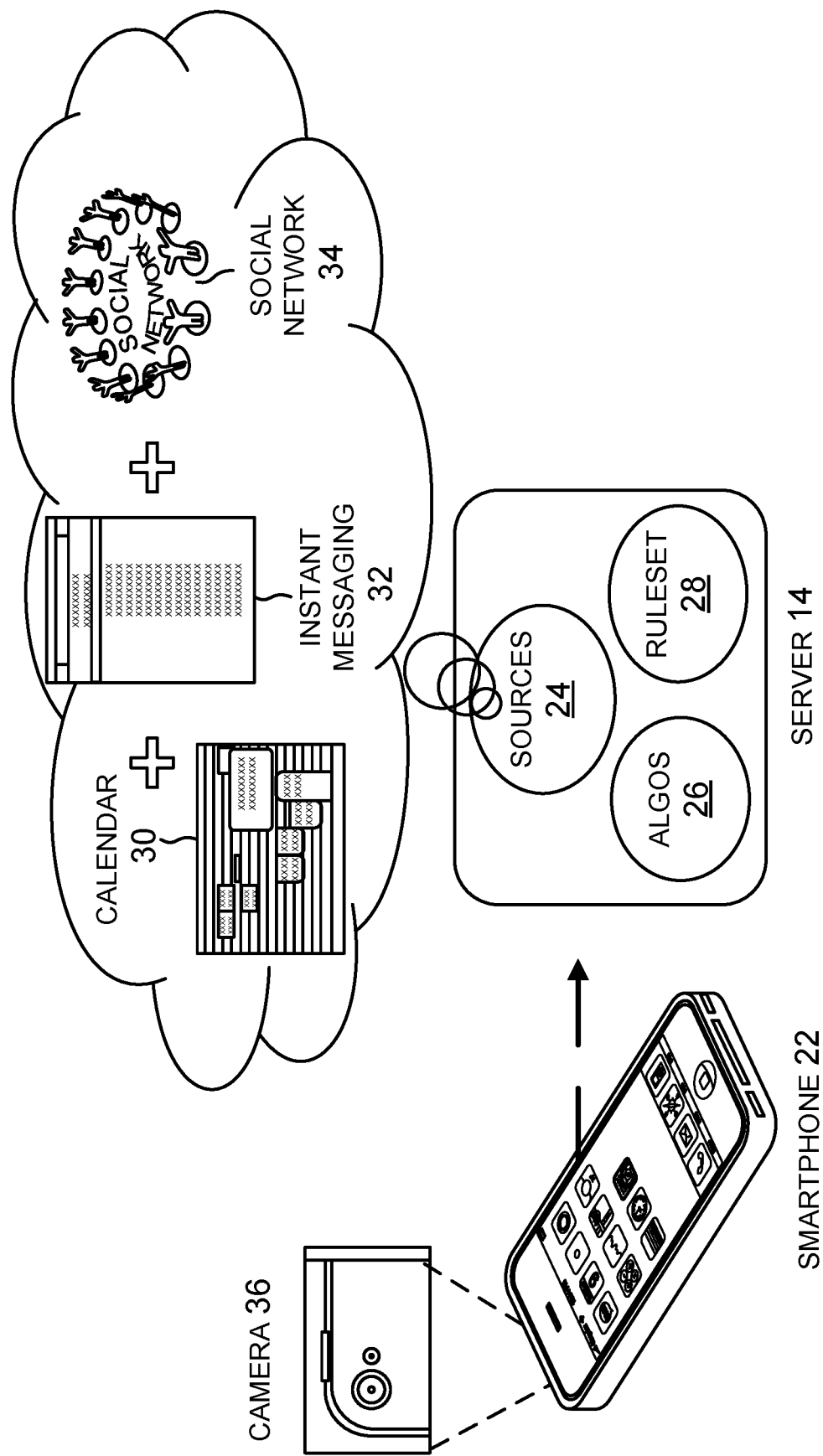
FIG. 2 is a schematic diagram that illustrates how the system collects information from the data sources, according to one embodiment.

FIG. 2 is a schematic diagram that illustrates how the system 10 collects information from the data sources 24, according to one embodiment.

The server 14 accesses one or more data sources 24 for the user, including such information as a calendar 30, instant messaging (IM) 32, social network applications 34, camera 36, etc., in order to determine the user's temporal status, i.e., user's situation or current activity. These data sources 24 may be stored on the server 14, the data storage 16, the smartphone 22, or elsewhere (i.e., the Internet, cloud-based storage, etc.), and synchronized therebetween.

Figure 3:
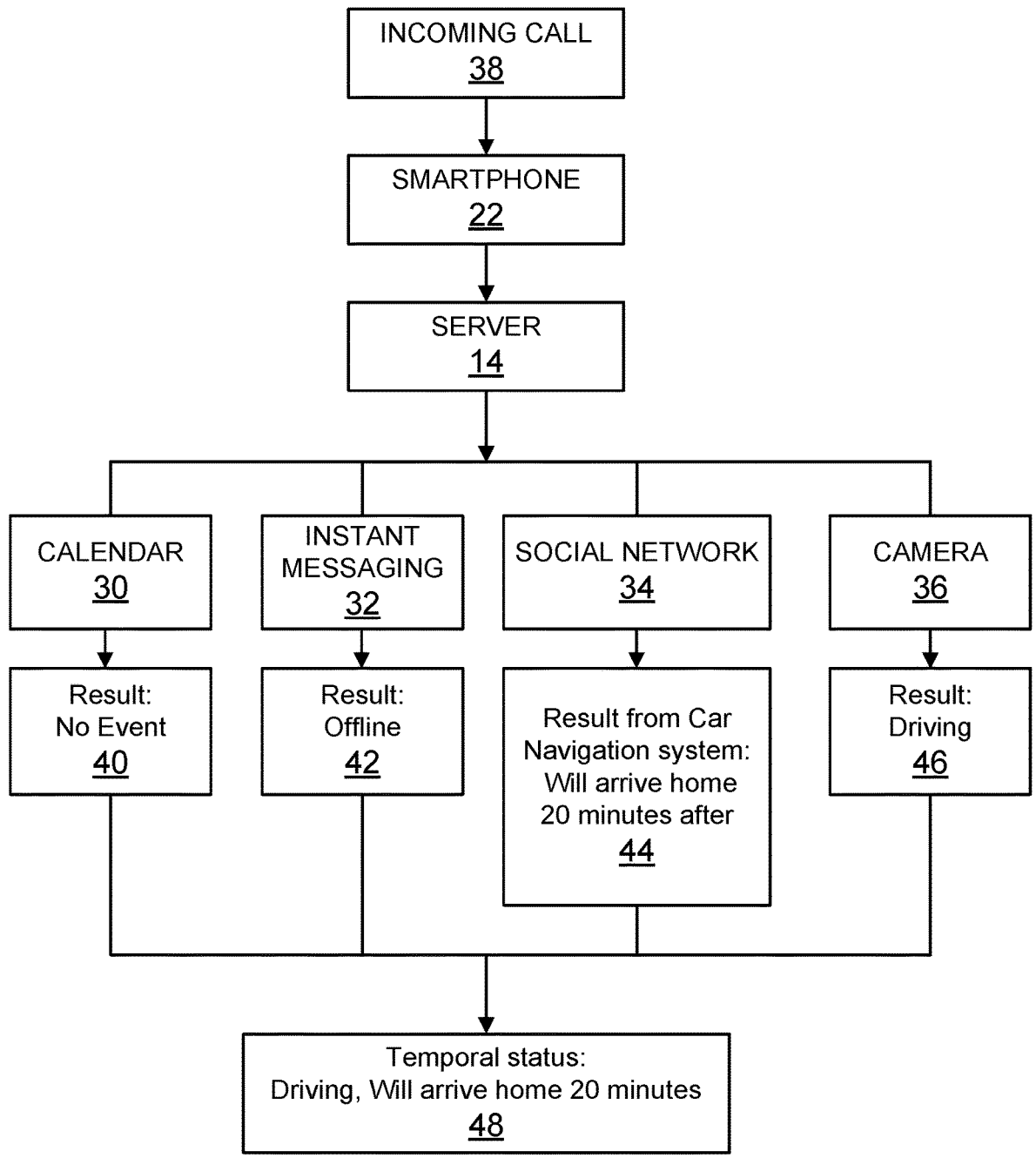
FIG. 3 is a flowchart that illustrates how the system analyzes the information collected from the data sources to determine the user's temporal status, according to one embodiment.

FIG. 3 is a flowchart that illustrates how the system 10 analyzes the information collected from the data sources 24 to determine the user's temporal status, according to one embodiment.

An incoming call 38 is received at the user's smartphone 22. The functions of the present invention are invoked by the incoming call 38, wherein the smartphone 22 sends, and the server 14 receives, a notification of the call.

The server 14 identifies data sources 24 for the user, such as the calendar 30, instant messaging 32, social network applications 34, camera 36, etc., in order to determine the user's temporal status. The server 14 then accesses one or more of the data sources 24, depending on the implementation and/or configuration.

The server 14 accesses the user's calendar 30 to determine whether there is a scheduled meeting, appointment or event. If so, the server 14 accesses information describing the scheduled meeting, appointment or event, including the subject or description, location, start time, end time, attendees, etc. In the example of FIG. 3, the results 40 indicate that there is no scheduled meeting, appointment or event for the user.

The server 14 accesses the user's instant messaging 32 to determine whether the user is available, busy, away, in a meeting, do not disturb, offline, etc. In the example of FIG. 3, the results 42 indicate that the user is offline.

The server 14 accesses the user's social network applications 34 to determine whether there is status related information for the user. This may involve collecting content from Connections™, Facebook™, Twitter™, WebEx™, Mapping, Navigation, and other similar applications, including messages or comments by the user or by others. In the example of FIG. 3, the results 44 include information from a vehicle navigation system indicating that the user's car is being driven and will arrive at the user's home in approximately 20 minutes.

The server 14 accesses the camera 36 in the user's smartphone 22 to obtain images that can assist determining the user's temporal status, and then uses this information to supplement or correct the information obtained from the calendar 30, instant messaging 32, and social network applications 34. For example, a face image from the camera 36 can be analyzed to identify the user. In another example, images from the camera 36 could be used to identify the environment of the user, such as in a meeting or driving a car. In yet another example, location tagging for the images taken by the camera 36 can be used to infer a geographic location for the user. In still another example, computer vision methods could be used to identify objects in the backgrounds of images taken by the camera 36, such as tables and chairs indicating a meeting room. In the example of FIG. 3, the results 46 indicate that the user is driving the user's car.

Block 48 represents the server 14 performing an analysis of the information gathered from the data sources 24, and generating a description of the user's temporal status, i.e., the user's situation or current activity, based on that analysis. In the example of FIG. 3, the server 14 determines that the user's temporal status is "driving; will arrive home in 20 minutes."

Figure 4:
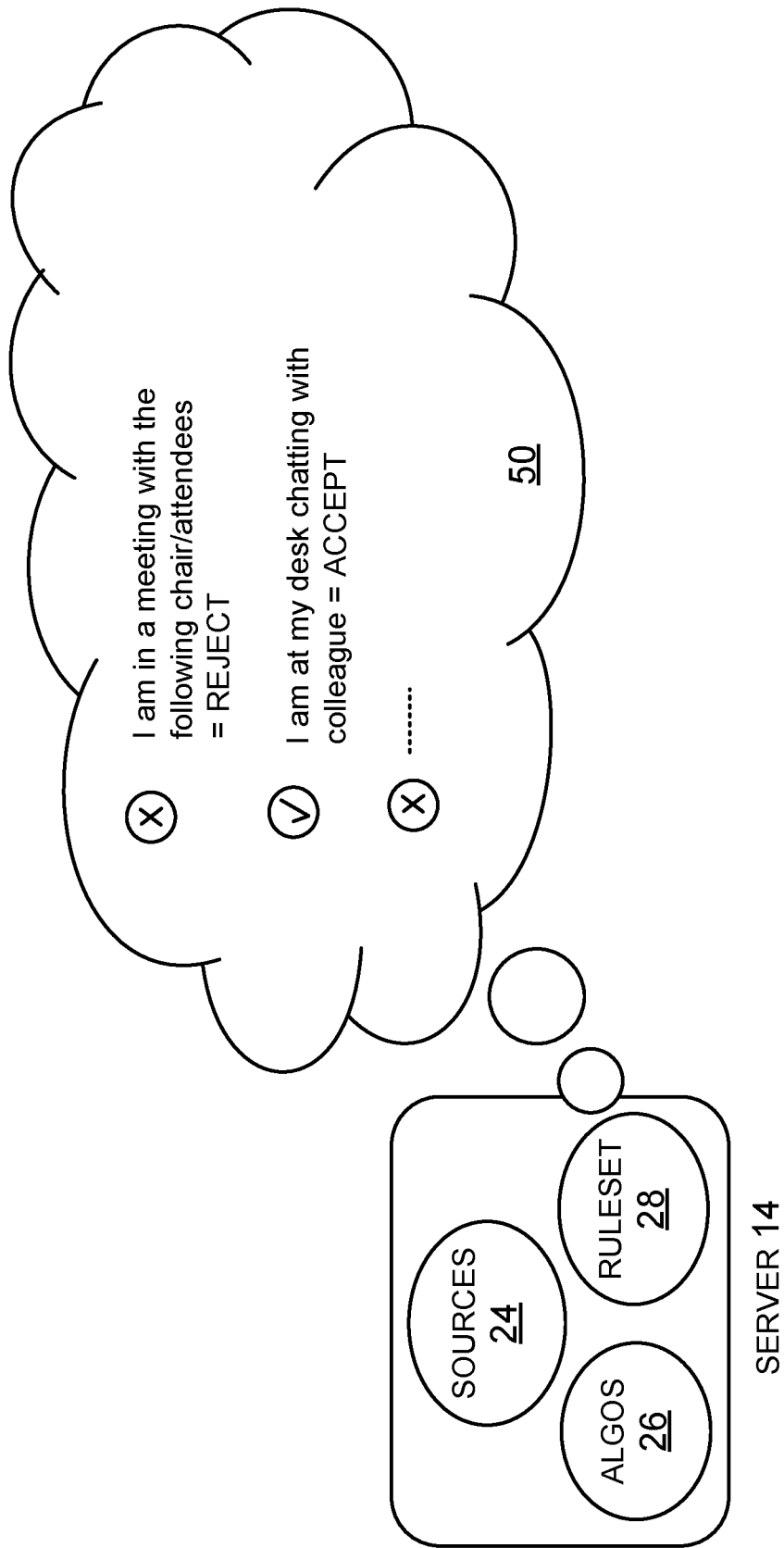
FIG. 4 is a schematic diagram that illustrates how the user pre-defines a ruleset in the system, according to one embodiment.

FIG. 4 is a schematic diagram that illustrates how the user pre-defines the ruleset 28 in the system 10, according to one embodiment. The pre-defined ruleset 28 includes one or more rules 50 specified by the user identifying when calls should be rejected or accepted.

In the example of FIG. 4, there are at least two rules 50 specified:
 Rule 1: "If I am in a meeting with the following chair/attendees=REJECT CALL"; and
 Rule 2: "If I am at my desk chatting with a colleague=ACCEPT CALL".

The server 14 will reject or accept an incoming call based on the execution of these rules 50 in the predefined ruleset 28. Specifically, the server 14 compares the rules 50 to the results from FIG. 3 to determine an action.

Figure 5:
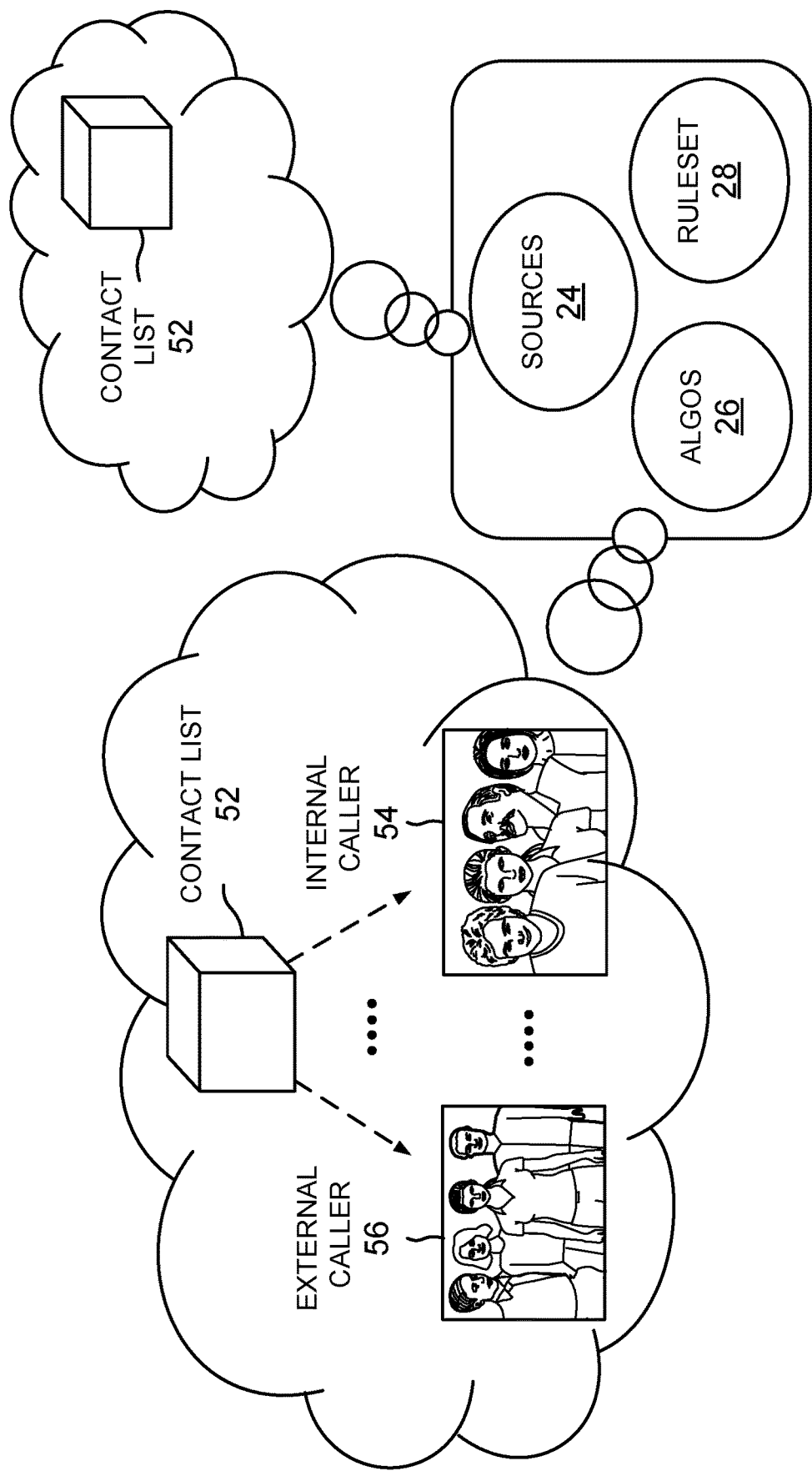
FIG. 5 is a schematic diagram that illustrates how the system identifies the caller, according to one embodiment.

FIG. 5 is a schematic diagram that illustrates how the system 10 identifies the caller using one or more data sources 24, according to one embodiment.

In the example of FIG. 5, the server 14 executes one or more stochastic algorithms 26 that identify the caller. Specifically, the stochastic algorithms 26 analyze the calling number to determine whether it exists in the user's contact list or directory 52. If so, then the server 14 analyzes other associated information in the user's contact list 52 (such as group information, tag information, address, etc.) to determine whether the calling number belongs to the same company as the user. If so, then the server 14 identifies the caller as an internal caller 54. Otherwise, the server 14 identifies the caller as an external caller 56.

Internal and external callers 54, 56 can be further identified. For example, internal callers 54 may be identified according to department, job title, role, etc., based on information in the user's contact list 52. In another example, external callers 56 may be identified as family, friends, customers, vendors, professional colleagues, etc., based on information in the user's contact list 52.

Figure 6:
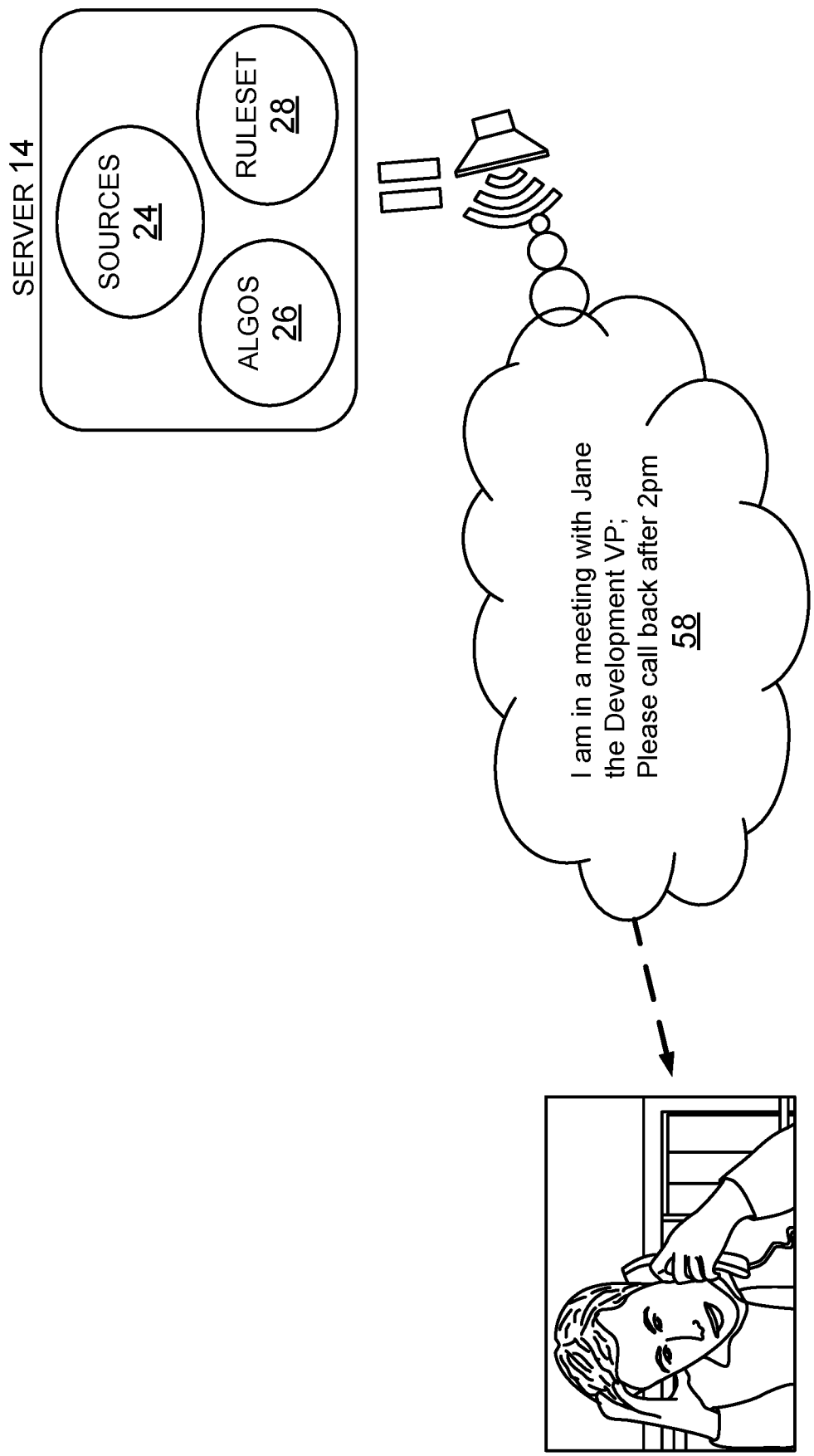
FIG. 6 is a schematic diagram that illustrates how the system generates a greeting or message when the incoming call is rejected or not accepted.

FIG. 6 is a schematic diagram that illustrates how the system 10 generates a greeting (e.g., a friendly message to the caller that describes the user's temporal status) or message (e.g., just the description of the user's temporal status), when the incoming call 38 is rejected or not accepted. Specifically, for calls that are rejected or not accepted, the calls are diverted to the user's voice mail, and the server 14 generates and provides a greeting or message 58 to the caller 60, depending on whether the caller 60 is identified as internal or external, and depending on the user's temporal status, according to an embodiment. The greeting or message 58 may be audio, video, text or any other format.

For example, an internal caller 60 may receive the message 58:
 "I'm in a meeting with Jane, the Development VP—please call back after 2 pm."

In another example, an external caller 60 may receive the message 58:
 "I'm in a very important meeting—please call back after 2 pm."

In still another example, the caller 60 may receive a generic message 58, such as a generic voice mail message:
 "Please leave your name and number, and I will return your call."

The generic message 58, such as the generic voice mail message, would likely be provided if the server 14 cannot identify the caller 60.

Figure 7:
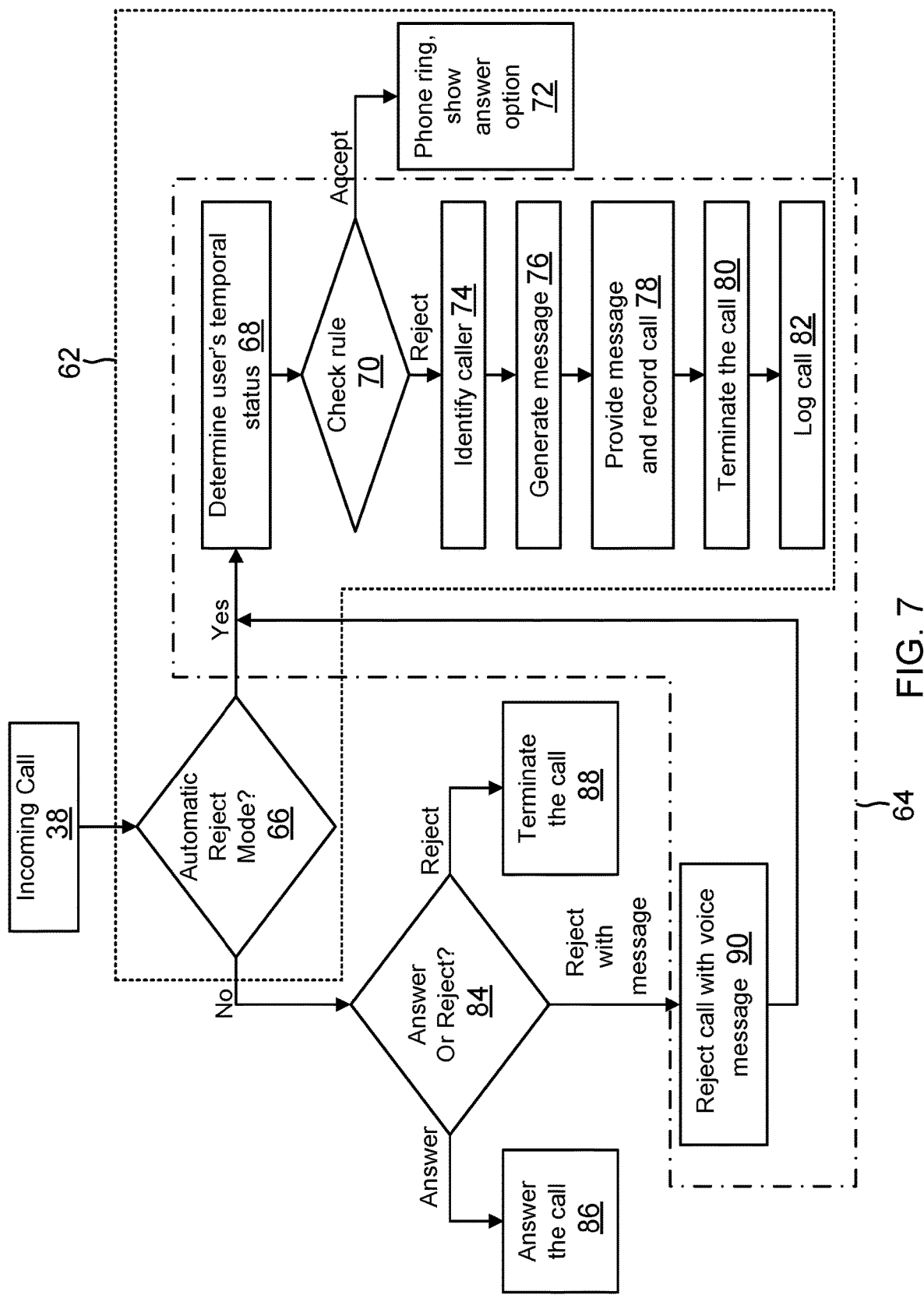
FIG. 7 is a flowchart that illustrates the operational flow of the system, according to one embodiment.

FIG. 7 is a flowchart that illustrates the operational flow of the system 10, according to one embodiment. The operation flow of the system 10 includes two modes of operation, an automatic reject mode 62 and a manual reject mode 64.

Block 38 represents the incoming call 38 to the user's smartphone 22. The functions of the present invention are invoked by the incoming call 38, wherein the smartphone 22 sends, and the server 14 receives, a notification of the call.

Block 66 is a decision block that determines whether the user or server 14 has specified an automatic reject mode 62. If so, blocks 68-82 are performed; otherwise, Blocks 84-88 are performed.

In the automatic reject mode 62, block 68 represents the server 14 accessing the data sources 24 for the user, such as a calendar 30, instant messaging 32, social network applications 34, camera 36, etc., in order to determine the user's temporal status. (These are the functions and steps described in FIG. 3.)

Block 70 is a decision block that determines whether the user has specified the pre-defined ruleset 28, which comprises one or more rules 50 identifying when calls should be rejected or accepted. (These are the functions and steps described in FIG. 4.)

If the rule 50 indicates that the incoming call 38 should be accepted (or if there are no rules 50), block 72 is performed, which results in the smartphone 22 ringing and the user being presented with an answer option, i.e., accept or reject the call.

Otherwise, if the rule 50 indicates that the incoming call 38 should be rejected, block 74 is performed.

Block 74 represents the server 14 determining the caller's identity, for example, identifying the caller as an internal or external caller 54, 56. (These are the functions and steps described in FIG. 5.)

Block 76 represents the server 14 generating the context-specific greeting or message 58 when the incoming call 38 is rejected, based on the user's temporal status and the caller's identity. (These are the functions and steps described in FIG. 6.)

Block 78 represents the server 14 providing the context-specific greeting or message 58 to the caller, and recording any voice mail from the caller.

Block 80 represents the server 14 terminating the incoming call 38.

Block 82 represents the server 14 logging the call, for example, recording the calling number of the incoming call 38, and other information, into a call log, and sending a notification of the call log to the user. The call log may include the calling number, the called number, the caller's identity, the user's temporal status, etc.

In the manual reject mode 64, block 84 is a decision block where the user manually decides, via input to the smartphone 22, to answer the incoming call 38 (at block 86), to reject the incoming call 38 (at block 88), or to reject the incoming call 38 by generating and providing a context-specific message 58 to the caller (at block 90), which comprises the manual reject mode 64.

In the manual reject mode 64, after block 90 is performed, blocks 68-82 are performed.

Benefits and Advantages

The present invention provides a number of benefits and advantages.

In one aspect, the present invention provides improvements to the technology or technical field of real-time communications systems. In another aspect, the present invention provides improvements to the functioning of the devices used in the real-time communications, including the server computers and client computers described above. In yet another aspect, the present invention describes the use of particular machines to accomplish the real-time communications, namely the server computers and client computers described above, which is accomplished by adding the functions and steps described above that are more than what is well-understood, routine and conventional in the field, and that confine the systems and methods described herein to a particular useful application.

For example, the present invention leverages information from a plurality of heterogeneous data sources to infer the user's situation and current activity with a high degree of precision for use in customizing the operation of the real-time communications system.

Moreover, based on the information from the plurality of heterogeneous data sources, a determination can be made by the real-time communications system whether to generate a message or greeting based on the user's situation and current activity, or whether instead to use just a generic message. Specifically, the real-time communications system uses more than just a current time and/or a current application usage to determine what message or greeting to provide. Instead, the real-time communications system leverages the user's calendar, instant messaging, social network applications, and camera images, to infer the user's situation and current activity.

The real-time communications system also uses cognitive methods to identify a caller's identity, and then generate the message or greeting based on the caller's identity. Specifically, these cognitive methods identify whether a caller is internal or external, and then generates different messages for different callers. This results in customized messages or greetings, rather than the same message or greeting for everyone.

The present invention also allows an incoming call to be accepted, rather than rejecting all calls. This avoids the problem of the user missing an important call. Instead, the present invention allows the user to specify a predefined rule set, wherein the rules identify whether to accept or reject calls, based not only on the user's situation and current activity, for example, but the caller's identity as well.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
   implementing, on one or more computers, a system for facilitating real-time communication with a caller without a called user accepting a call, wherein the system:
   receives a notification of the call;
   obtains information about the called user and an identity of the caller from one or more data sources including at least the called user's smartphone camera and an image repository of the called user's smartphone to obtain images, wherein one or more objects in backgrounds of the obtained images are identified;
   determines the called user's temporal status and the caller's identity as internal or external based on the information, including information obtained at least from the images of the called user's smartphone;
   generates a context-specific message to the caller based on both the called user's temporal status and the caller's identity, wherein the context-specific message to the caller summarizes the called user's temporal status, and the context-specific message to the caller is different depending on whether the caller's identity is determined as external or internal; and
   provides the context-specific message to the caller.

2. The method of claim 1, wherein the information about the called user is obtained from the called user's calendar to determine whether there is a scheduled meeting, appointment or event.

3. The method of claim 1, wherein the information about the called user is obtained from the called user's instant messaging to determine whether the called user is available, busy, away, in a meeting, do not disturb, or offline.

4. The method of claim 1, wherein the information about the called user is obtained from the called user's social network applications to determine whether there is status related information for the called user.

5. The method of claim 1, wherein the called user's temporal status is determined at a given point in time.

6. The method of claim 1, wherein the information about the caller is obtained from a calling number and the called user's contact list.

7. The method of claim 1, wherein the caller's identity is determined from the calling number and the called user's contact list.

8. The method of claim 1, wherein the message is a generic message when the caller's identity cannot be determined.

9. The method of claim 1, wherein the system performs a rule that automatically accepts or rejects the call, wherein the message is provided to the caller when the call is not accepted or rejected.

10. The method of claim 1, wherein the called user pre-defines the rules identifying when calls should be rejected or accepted.

11. A computer-implemented apparatus, comprising: one or more computers implementing a system for facilitating real-time communication with a caller without a called user accepting a call, wherein the system:
    receives a notification of the call;
    obtains information about the called user and an identity of the caller from one or more data sources including at least the called user's smartphone camera and an image repository of the called user's smartphone to obtain images, wherein one or more objects in backgrounds of the obtained images are identified;
    determines the called user's temporal status and the caller's identity as internal or external based on the information, including information obtained at least from the images of the called user's smartphone;
    generates a context-specific message to the caller based on both the called user's temporal status and the caller's identity, wherein the context-specific message to the caller summarizes the called user's temporal status, and the context-specific message to the caller is different depending on whether the caller's identity is determined as external or internal; and provides the context-specific message to the caller.

12. The apparatus of claim 11, wherein the information about the called user is obtained from the called user's calendar to determine whether there is a scheduled meeting, appointment or event.

13. The apparatus of claim 11, wherein the information about the caller is obtained from a calling number and the called user's contact list.

14. The apparatus of claim 11, wherein the system performs a rule that automatically accepts or rejects the call, wherein the message is provided to the caller when the call is not accepted or rejected.

15. A computer program product comprising a computer readable storage medium having program instructions embodied therewith, the program instructions executable by one or more computers to cause the computers to:

implement a system for facilitating real-time communication with a caller without a called user accepting a call, wherein the system:

receives a notification of the call;

obtains information about the called user and an identity of the caller from one or more data sources including at least the called user's smartphone camera and an image repository of the called user's smartphone to obtain images, wherein one or more objects in backgrounds of the obtained images are identified;

determines the called user's temporal status and the caller's identity as internal or external based on the information, including information obtained at least from the images of the called user's smartphone;

generates a context-specific message to the caller based on both the called user's temporal status and the caller's identity, wherein the context-specific message to the caller summarizes the called user's temporal status, and the context-specific message to the caller is different depending on whether the caller's identity is determined as external or internal; and provides the context-specific message to the caller.

16. The computer program product of claim 15, wherein the information about the called user is obtained from the called user's calendar and the information about the caller is obtained from a calling number and the called user's contact list.

17. The computer program product of claim 15, wherein the system performs a rule that automatically accepts or rejects the call, wherein the message is provided to the caller when the call is not accepted or rejected.

* * * * *